(12) United States Patent
Zhang et al.

(10) Patent No.: US 9,572,351 B2
(45) Date of Patent: Feb. 21, 2017

(54) AUTOMATIC BREAD MAKER, INGREDIENT BOX AND BREAD MAKING METHOD

(71) Applicant: TSANN KUEN (ZHANGZHOU) ENTERPRISE CO., LTD., Zhang Zhou, Fujian (CN)

(72) Inventors: Zhonghua Zhang, Zhang Zhou (CN); Shangqian Gao, Zhang Zhou (CN); Fudong Cui, Zhang Zhou (CN); Shihchin Chen, Taipei (TW)

(73) Assignee: TSANN KUEN (ZHANGZHOU) ENTERPRISE CO., LTD., Zhang Zhou (CN)

(*) Notice: Subject to any disclaimer, the term of this patent is extended or adjusted under 35 U.S.C. 154(b) by 679 days.

(21) Appl. No.: 14/031,577

(22) Filed: Sep. 19, 2013

(65) Prior Publication Data

US 2014/0079844 A1    Mar. 20, 2014

(30) Foreign Application Priority Data

Sep. 19, 2012   (CN) .......................... 2012 1 0349663
Sep. 6, 2013    (CN) .......................... 2013 1 0403949

(51) Int. Cl.
| | |
|---|---|
| A47J 37/08 | (2006.01) |
| A21B 7/00 | (2006.01) |
| A21D 8/00 | (2006.01) |
| A21D 10/00 | (2006.01) |
| A21C 1/00 | (2006.01) |

(52) U.S. Cl.
CPC ............... *A21B 7/005* (2013.01); *A21C 1/006* (2013.01); *A21D 8/00* (2013.01); *A21D 10/002* (2013.01)

(58) Field of Classification Search
CPC ........... A21B 7/005; A21C 1/00; A21C 1/003; A21C 1/14; A21C 1/006; A21C 1/02; B01F 7/00291; B01F 7/0015; B01F 7/00058; B01F 7/18; B01F 7/162; A47J 37/01; A47J 37/015; A21D 8/00; B26D 1/045
USPC ......... 99/334, 339, 342, 348, 352, 426, 427, 99/486, 489, 493, 516, 538; 219/392, 219/391; 248/176.2
See application file for complete search history.

(56) References Cited

U.S. PATENT DOCUMENTS

| | | | | |
|---|---|---|---|---|
| 2,951,432 A | * | 9/1960 | Lawser | A47J 37/0814 99/329 R |
| 4,803,086 A | * | 2/1989 | Hedenberg | A21B 7/00 426/112 |
| 4,874,618 A | * | 10/1989 | Seaborne | A23G 9/04 426/103 |
| 5,549,382 A | * | 8/1996 | Correia, II | B01F 11/0082 126/374.1 |
| 5,656,311 A | * | 8/1997 | Fond | B65D 85/8043 426/112 |
| 6,093,430 A | * | 7/2000 | Gupta | B65D 75/327 206/232 |

(Continued)

Primary Examiner — Eric Stapleton
(74) Attorney, Agent, or Firm — Rabin & Berdo, P.C.

(57) ABSTRACT

A method of making bread uses an automatic bread maker and an ingredient box. The method includes: put the bread ingredient with flour and baking powder according to proper formula into the accommodating room of the ingredient box and packaged; then place the ingredient box faced down in the hanging rack above the baking pan inside the automatic bread maker, operate the bread maker to make the sawtooth blade of the hanging rack pierced the film of the ingredient box and the bread ingredient inside fell down into the baking pan, then water the baking pan; close the housing of the automatic bread maker and turn on the baking pan, the bread ingredient is processed with working dough of mixing, stirring and kneading; get the baking pan out, and remove the bread of baked and shaped.

30 Claims, 15 Drawing Sheets

(56) References Cited

U.S. PATENT DOCUMENTS

| | | | | |
|---|---|---|---|---|
| 6,217,924 B1* | 4/2001 | Sit | ............... | A21B 7/005 426/233 |
| 6,401,599 B1* | 6/2002 | Maeda | ............... | A21B 7/005 366/146 |
| 7,600,468 B2* | 10/2009 | Zhang | ............... | A47J 37/0842 219/392 |
| 8,568,810 B2* | 10/2013 | Wen | ............... | A47J 37/015 426/115 |
| 8,631,737 B2* | 1/2014 | Zhang | ............... | A47J 37/08 99/332 |
| 8,778,426 B2* | 7/2014 | Wen | ............... | A47J 37/015 426/115 |
| 2004/0050257 A1* | 3/2004 | Lee | ............... | A21B 7/005 99/348 |
| 2006/0207437 A1* | 9/2006 | Zhang | ............... | A47J 37/0842 99/389 |
| 2008/0020111 A1* | 1/2008 | Park | ............... | A21B 7/005 426/416 |
| 2008/0105136 A1* | 5/2008 | McFadden | ............... | A21B 1/245 99/339 |
| 2011/0132202 A1* | 6/2011 | Zhang | ............... | A47J 37/08 99/332 |
| 2011/0195162 A1* | 8/2011 | Wen | ............... | A47J 37/015 426/233 |
| 2013/0000491 A1* | 1/2013 | Ito | ............... | A21B 7/005 99/335 |
| 2013/0186285 A1* | 7/2013 | Wen | ............... | A47J 37/015 99/348 |
| 2013/0189406 A1* | 7/2013 | Wen | ............... | A47J 37/015 426/233 |

* cited by examiner

AUTOMATIC BREAD MAKER, INGREDIENT BOX AND BREAD MAKING METHOD

FIELD OF THE INVENTION

The present invention relates to an automatic bread maker for home made, a supporting bread ingredient box thereof and a bread making method using these devices.

BACKGROUND OF THE INVENTION

The bread maker for home made bread is more and more popular in the families and individuals with simple structure and it is more time-saving than the traditional bread making method. When used, the user needs to mix every bread ingredient including the ingredient like flour, fermentation powder and water, and the accessory like sauce, fruit, nut and others; these ingredients need to be weighted and counted, which takes much time. Moreover, it also needs technique and experience to obtain tasty bread. Different types and taste bread requires different composition of the ingredient, which requires higher proportional technique. On the other hand, the baking needs special technique, different baking process for different type of the bread. People have to get the composition of the ingredient for different baking for processing. Though the existing bread maker is simple in the baking processing, the composition of the ingredient is still a problem needed to be solved. And people have to learn for different composition of the ingredient and proper baking process, which costs much and is inconvenient. Moreover, the process of the home made bread has low fault tolerant rate, which is liable to lead to the failure of the bread due to the error in the composition of the ingredient and the process.

SUMMARY OF THE INVENTION

To solve the problem of the existing bread maker and the making method thereof, the present invention is provided with an automatic bread maker, a supporting bread ingredient box and the corresponding making method, the technical proposal is as below:

An automatic bread maker, comprising a housing, a baking pan is disposed inside the housing to mix or heat the bread ingredient, the baking pan is disposed with an entrance of faced up; wherein inside the housing, a hanging rack to place a bread ingredient box and a stock bin below the hanging rack are disposed above the entrance of the baking pan; the hanging rack is disposed with a sawtooth blade to pierce the ingredient box, the stock bin is disposed with a drop opening; the sawtooth blade is faced up; the drop opening is faced to the entrance, the size of the drop opening is smaller than that of the entrance; when the ingredient box is pierced, the bread ingredient of the ingredient box is dropped down to the stock bin; the stock bin includes a tubular wall and a cover coupled to the drop opening at the bottom of the wall; a driving mechanism is further disposed to control the cover to be open or to be closed relative to the wall to make the bread ingredient inside the stock bin fell down from the drop opening or kept inside the stock bin.

In another preferred embodiment, the shape of the sawtooth blade rounded in the horizontal plane is I shaped or non-closed circularity shaped.

In another preferred embodiment, a lid is disposed above the hanging rack to flexible connected to the housing; when the lid is pressed down to couple to the position of the housing, the ingredient box is driven to be positioned to be pierced by the sawtooth blade.

In another preferred embodiment, the hanging rack is disposed with a tray, the tray is coupled to the external periphery of the lower of the ingredient box to limit the ingredient box in the horizontal plane; the tray is movable to couple to the hanging rack in the vertical direction, the tray is disposed with a tray hole, the sawtooth blade can be passing through the tray hole.

In another preferred embodiment, the hanging rack is movably coupled to the housing up and down; the hanging rack is disposed with a self-locking device, when the hanging rack is falling to an unlock position relative to the housing, the self-locking device unlocks, so that the tray falls down inside the hanging rack, then the sawtooth blade gets up and passes through the tray; when the hanging rack is situated at the outside of the unlock position relative to the housing, the self-locking device prevents the tray falling down inside the hanging rack, making the sawtooth blade unable to get up to pass through the tray.

In another preferred embodiment, the self-locking device comprising:

a pushing block, which is coupled to the hanging rack in laterally sliding way, the pushing block is disposed with a limiting hole and an inclined guiding surface;

a limited post, which is fixed to the tray and extended downwards, the limited post is vertical to the laterally moving path of the pushing block;

a control block, which is fixed to the housing; the control block is contacted with the inclined surface to push the pushing block at the pressing path of the hanging rack;

the unlocking position is as below: when the hanging rack is falling down to a certain height, the control block is withstood the inclined surface of the pushing block, making the pushing block moving laterally to a certain position, and finally the limited post of the tray moves downward and just passes through the limiting hole;

a restoring spring is disposed between the pushing block and the hanging rack.

In another preferred embodiment, a buffer mechanism is disposed at the housing in the position holding the hanging rack, the buffer mechanism is disposed with a lifting lever, which is pivot joint to the housing, one end of the lifting lever is supported the hanging rack; a connecting rod is further disposed, two ends of the connecting rod are respectively movably coupled to the lifting lever and the lid of the housing;

when the lid is situated in open position, the lid draws the lifting lever to hold up through the connecting rod, making the lifting lever held one side of the hanging rack, so that the hanging rack can not be fell down to the unlock position;

when the lid is situated in the close position, the lid releases to draw the connecting rod, making the lifting lever fell down, so that the hanging rack is released and fell down to the unlock position.

In another preferred embodiment, a shockproof mechanism is disposed inside the housing near the hanging rack, the shockproof mechanism is controlled to make the ingredient box placed in the hanging rack shaking, making the bread ingredient inside the ingredient box totally fell down.

In another preferred embodiment, the cover is pivot joint to the stock bin in single gate opened downwards way.

In another preferred embodiment, the cover is pivot jointed to the stock bin in double-gate opened downwards way.

In another preferred embodiment, the shaft of the cover is fixed with a pendulum arm; the driving mechanism is disposed with an electromagnet, the pendulum arm is pulled by an armature of the electromagnet through a rod to control the cover.

In another preferred embodiment, the wall of the stock bin is gradually narrowed from up to down, the cover is coupled to the end surface in the bottom of the wall.

In another preferred embodiment, the sawtooth blade is movably coupled to the hanging rack in the vertical direction, the sawtooth blade is controlled by an unloading electromagnet, the unloading electromagnet is controlled to drive the sawtooth blade to move up and down to pierce the film of the ingredient box.

In another preferred embodiment, the housing is disposed with a water tank and a water pipe below the water tank, the water pipe is controlled to transfer the water in the water tank to the baking pan.

In another preferred embodiment, the housing is disposed with a control block and a recognition device, the formula information on the ingredient box is detected and read by the recognition device and then transmitted to the control block, the control block sets different cooking programs according to the formula information.

In another preferred embodiment, the baking pan is in and out of the housing from the side of the housing.

In another preferred embodiment, the hanging rack is inclined relatively to the horizontal plane; the ingredient box placed on the hanging rack is inclined relatively to the horizontal plane as well.

The technical proposal of a bread ingredient box coupled to above automatic bread maker is as below:

A ingredient box applied in the above automatic bread maker, wherein the bread ingredient box with bread ingredient inside is disposed with a hard side wall, two ends of the side wall are respectively disposed with a first wall and a second wall, the first wall is a film easy to be pierced, and the film is applied together with the sawtooth blade of the hanging rack, when the second wall is pressed down, the sawtooth blade pierces the first wall.

In another preferred embodiment, the thickness of the film is ranged from 0.01 to 0.05 mm.

In another preferred embodiment, the shape of the film is coupled to that of the sawtooth blade.

In another preferred embodiment, the ingredient box has two accommodating rooms, the number of the first wall is two, two first walls are respectively corresponding to the accommodating rooms; one of the accommodating rooms is loaded with the bread ingredient, the other one is loaded with bread accessory with fruit.

In another preferred embodiment, the exterior is disposed with formula mark of machine readable.

In another preferred embodiment, the first wall is disposed in a plane, the film is coupled to the periphery of the top surface of the mouth of the ingredient box.

In another preferred embodiment, the side wall of the accommodating room is an inclined surface of gradually widened from the top surface to the bottom surface or an inclined surface of widened in sections.

In another preferred embodiment, the inclined surface is gradually widened, the inclined angle is ranged from 3° to 20°.

In another preferred embodiment, the inclined surface is gradually widened, the inclined angle is 7°.

In another preferred embodiment, the side wall is rectangle shaped.

In another preferred embodiment, the second wall and the side wall are applied with different hard material.

In another preferred embodiment, the second wall and the side wall are applied with same hard material.

In another preferred embodiment, the hard material is used with PP.

The technical proposal of a bread making method applied with above automatic bread maker and the ingredient box is as below:

A bread making method, wherein comprising:

step 1. a bread ingredient box with a weak outer wall is provided;

step 2. the bread ingredient with flour and baking powder according to proper formula is put into the first accommodating room of the bread ingredient box and packaged;

step 3. place the bread ingredient box faced down in the hanging rack above the baking pan inside the automatic bread maker, operate the bread maker to make the sawtooth blade of the hanging rack pierced the wall of the bread ingredient box and then the bread ingredient inside is dropped down to different stock bins for temporary storage, control the covers of the stock bin open at different times as required, making the bread ingredient dropped to the baking pan, water the baking pan at the same time;

step 4. close the housing of the automatic bread maker and turn on the baking pan of the automatic bread maker, the bread ingredient is processed with working dough of mixing, stirring and kneading, get a first dough from the baking pan;

step 5. the dough in the baking pan is resting and fermentation, make the fermentation air degassing out of the dough;

step 6. the dough in the baking pan is heated and baked until the bread is shaped well; get the baking pan out, and remove the shaped bread.

In another preferred embodiment, in the step 2, the bread accessory is put into the second accommodating room of the bread ingredient box, a step 7 is further added between the step 5 and step 6, put the bread accessory in the second accommodating room into the baking pan, the bread accessory is kneaded with the first dough to form the second dough.

In another preferred embodiment, a control block is provided to control the automatic bread maker by detecting and reading the formula information on the bread ingredient box to get different baking methods according to the formula information; the baking method includes the working process of the stirring blade in the baking pan, the heating process of the automatic bread maker and the water flow control.

The advantages of the present invention are as below:

1. The bread making method is provided with an automatic bread maker and an ingredient box, which saves the prepare time of the bread ingredient and making it a standardization module, that is the ingredient box; and the baking operation is simplified, the film of the ingredient box is pierced directly, the bread ingredient is unloaded to be baked after watered. This way prevents error of fermentation of the bread, and the method is simplified with low fault rate.

2. The bread ingredient can be mass produced with maximally keeping the conformance of the taste.

3. With the controlled water tank and the water pipe, the watering is automatic; there are several controlling methods for the water pipe of the water tank with water rationing.

4. With the unloading electromagnet, the ingredient box can unload the ingredient in pre-set time to meet the needs of more bread technical proposal and prevent the overflow and blossoming of the powder due to the pierced film when the ingredient box is improper disposed.

5. With the stock bin, the unloading from individual accommodating room is controlled, expanding the applicability of the home made bread method and the proposal of the home made bread, enriching the variety of the bread.

BRIEF DESCRIPTION OF THE DRAWINGS

The present invention is further described with the drawings and the embodiments.

DETAILED DESCRIPTION OF THE EMBODIMENTS

The First Embodiment

Figure 1:
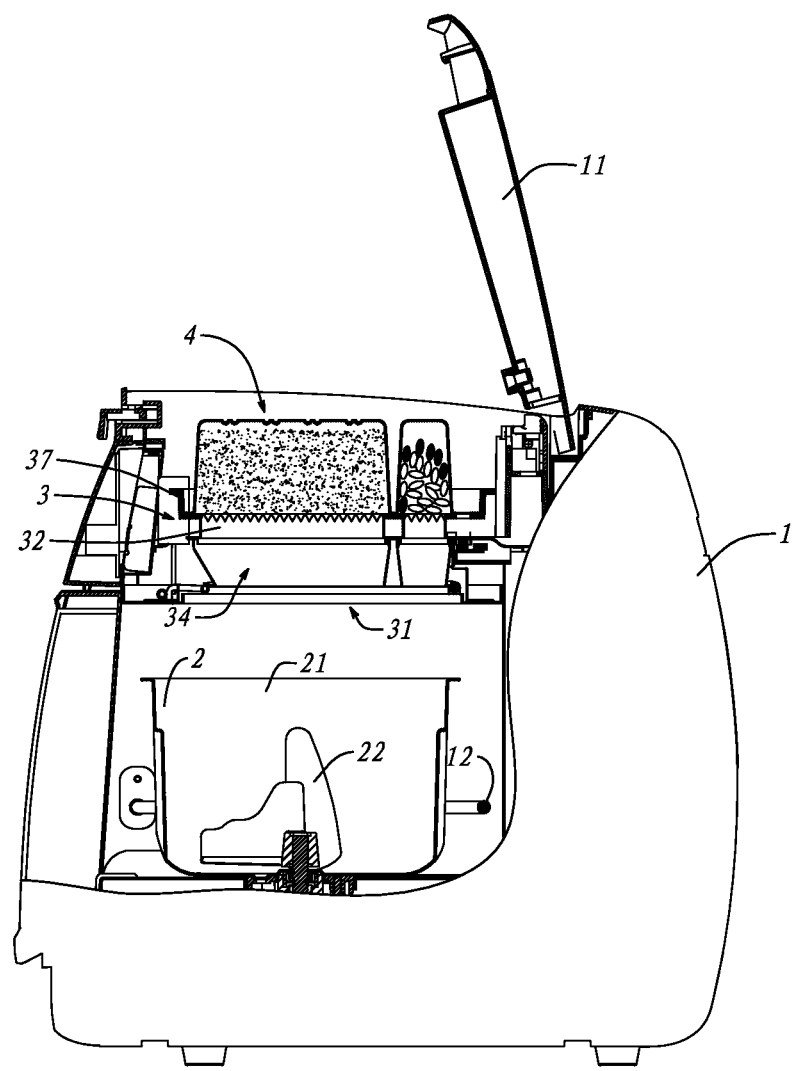
FIG. 1 illustrates the sectional view of the first embodiment of the present invention with a bread ingredient box and an automatic bread maker.

The first embodiment of the present invention, please refer to FIG. 1 to FIG. 5 and FIG. 13, includes a whole ingredient box 4 and a whole automatic bread maker;

FIG. 1 illustrates the sectional view of the automatic bread maker assembled with a ingredient box 4; the automatic bread maker includes a housing 1, which is disposed with a baking pan 2. The baking pan 2 is disposed with a stirring blade 22, the external of baking pan 2 is disposed with a heater 12. So the baking pan 22 and the subparts are provided with general functions of stirring and heating.

The baking pan 2 has an opening 21 faced up. Inside the housing 1, a hanging rack 3 is disposed above the opening 21 of the baking pan 2. The ingredient box 4 can be placed on the hanging rack 3 and positioned; and a sawtooth blade 32 and a tray 37 are disposed in the hanging rack 3. A stock bin 34 and a drop opening 31 of the stock bin 34 are disposed below the sawtooth blade 32. the sawtooth blade 32 is at the bottom of the positioned ingredient box 4, and the drop opening 31 is below thereof; the opening 21 of the baking pan 2 is below the drop opening 31; the size of the drop opening 31 is smaller than that of the opening 21, preventing the overflow and blossoming of the powder.

FIG. 1 illustrates the first working state of the first embodiment, therein the ingredient box 4 is just put into the hanging rack 3 and positioned, the lid 11 of the housing 1 is open, and the ingredient box 4 is not pressed yet.

Figure 2:
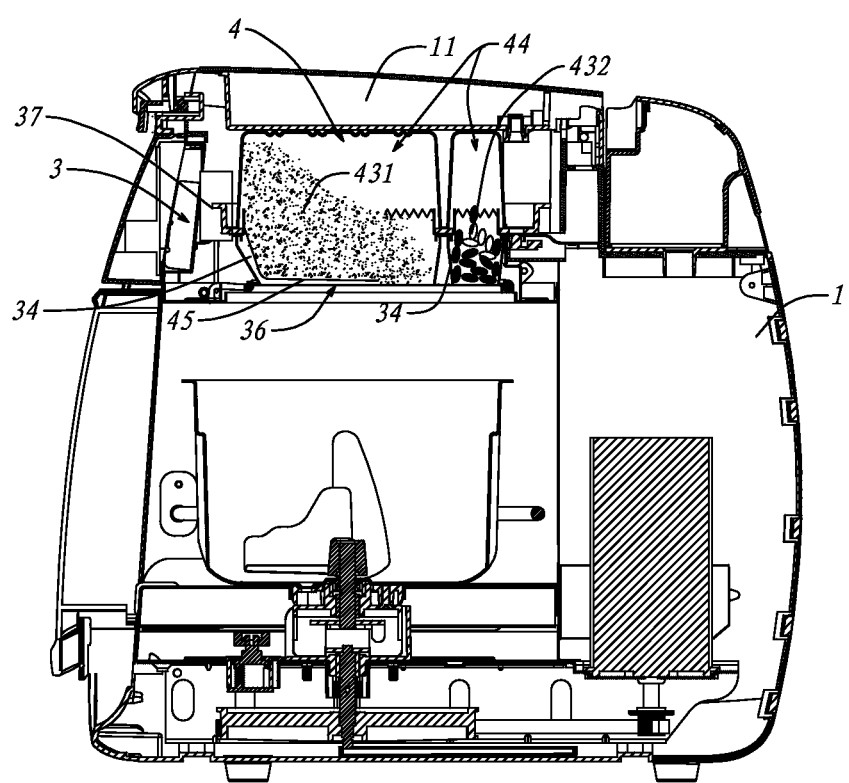
FIG. 2 illustrates the first working state of the first embodiment in FIG. 1.

As figured in FIG. 2 of a working state of the FIG. 1, thereinto, when the ingredient box 4 is placed on the tray 37, the lid 11 is depressed, making the entirety of the ingredient box 4 and the tray 37 subsided, the film of the ingredient box 4 is pierced, the bread ingredient including the main ingredient 431 and the accessory 432 is fully unloaded to the stock bin 34 and they are still individually retained. Meanwhile, the ingredient box 4 is positioned relative to the hanging rack 3.

Figure 3:
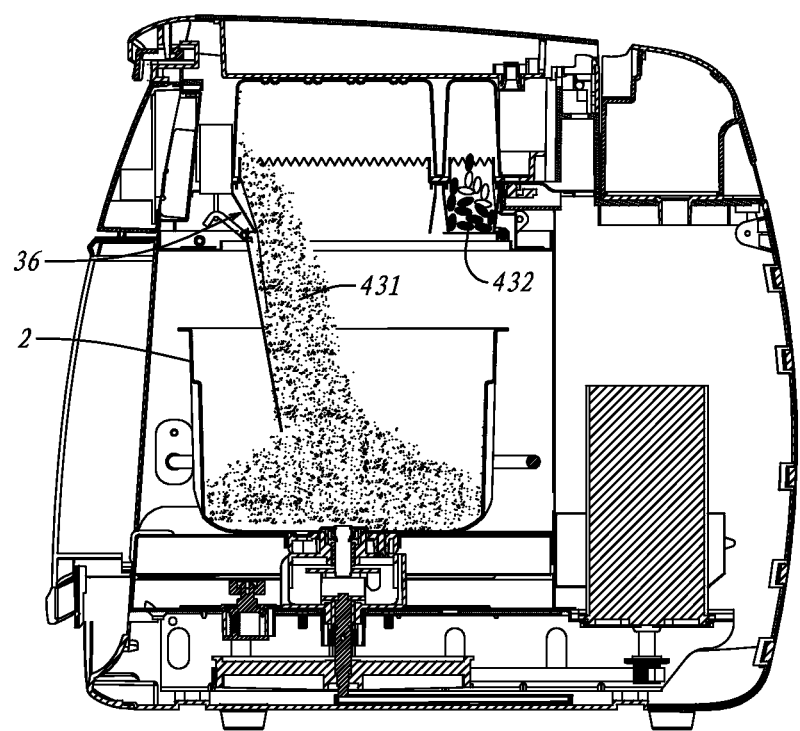
FIG. 3 illustrates the second working state of the first embodiment in FIG. 1.

As figured in FIG. 3, basic in the FIG. 2, the left bigger cover 36 is open, making the main ingredient 431 fully unloaded to the baking pan 2. the baking pan 2 can be pre-watered; basic in FIG. 3, the main ingredient 431 is mixed, stirred, kneaded and fermented.

Figure 4:
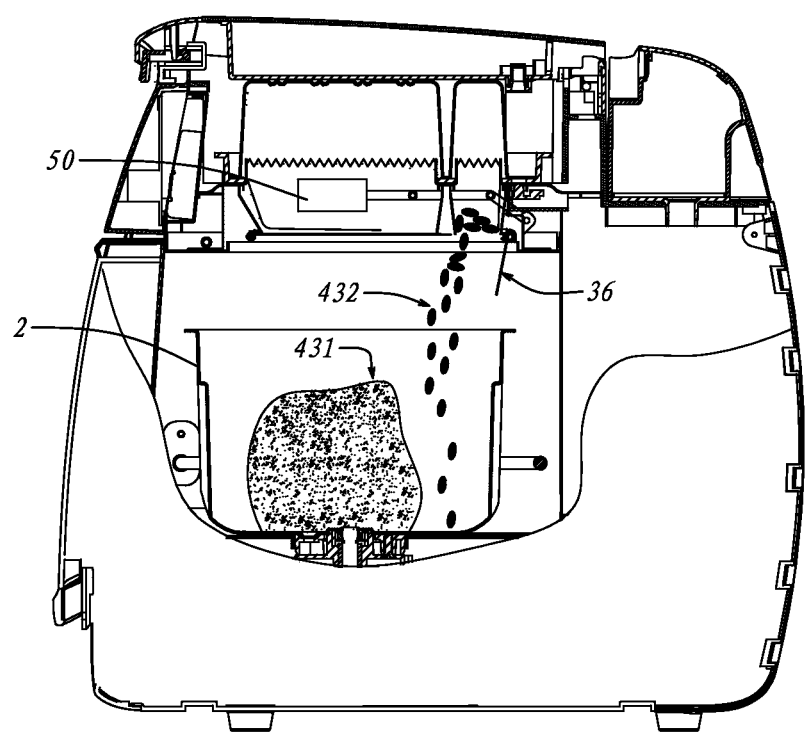
FIG. 4 illustrates the third working state of the first embodiment in FIG. 1.
Figure 5:
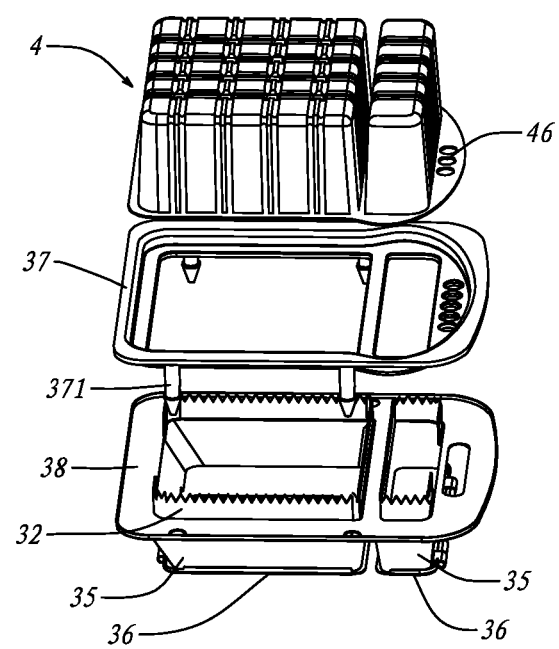
FIG. 5 illustrates the structure of the ingredient box and the hanging rack of the first embodiment in FIG. 1.

FIG. 4 is another working state basic in FIG. 3. In this state, the bread main ingredient 431 has been stirred and fermented to get the first dough, then open the right smaller cover 36 to make the bread accessory 432 to drop into the baking pan 2 to mix with the main ingredient 431, then stir and knead the mixture. Get the second dough from the first dough mixed with the bread accessory 432. after finishing the state, start the heating and other process of the baking pan 2. Finally, get the bread baked from the baking pan 2.

With the stock bin 34, it is available for the individual accommodating room 44 to unload the ingredient, much expanding the applicability of the home making bread method. Some accessory is not proper to process with the main ingredient, like large grained nuts, currant, spice or other food. In one hand, it will affect the taste and effect if the large grained food is early processed. In another hand, it brings extra work to the stirring blade. So it makes the bread formula in the individual accommodating room of the ingredient box 4 separately controlled, the home making bread technical expanded and the bread variety enriched.

This embodiment has other characters:

The hanging rack 3 of this embodiment is disposed with a tray 37. As figured in the FIG. 5 of the structure of the ingredient box 4 and the hanging rack 3 and the stock bin 34. The ingredient box 4 is limited by the tray 37 in the horizontal direction. The tray 37 is movable up and down relative to the hanging rack 3 inside the hanging rack 3. The four tray posts 371 are coupled to and inserted into a separator 38 and they are movable up and down with respect to the separator 38. The separator 38 is fixed with the sawtooth blade 32, which is non-closed circularity shaped in the horizontal plane. Moreover, each individual accommodating room 44 corresponding to the ingredient box 4 is disposed with a ring of the sawtooth blade 32. The tray 37 is disposed with a tray hole inside, the sawtooth blade 32 is passed through the tray hole and it is movable up and down with respect to the tray 37. With the tray 37, the film is pierced in the manner that the ingredient box 4 is depressed, simplifying the step and preventing too many control components to drive the sawtooth blade 32; in the other hand, the tray 37 retains the lateral stability when the ingredient box 4 is depressed. The pierced position and shape is well compared to that the ingredient box 4 is situated above the sawtooth blade 32.

Below the sawteeth blade 32, the wall 35 of the stock bin 34 is fixed to the separator 38, the wall 35 is gradually narrowed from up to down. The cover 36 is coupled to the end face of the bottom of the wall 35, making the powdered bread ingredient temporally stored inside the stock bin 34 and not dropped down. The individual accommodating room is coupled to individual wall 35 and cover 36.

Figure 13:
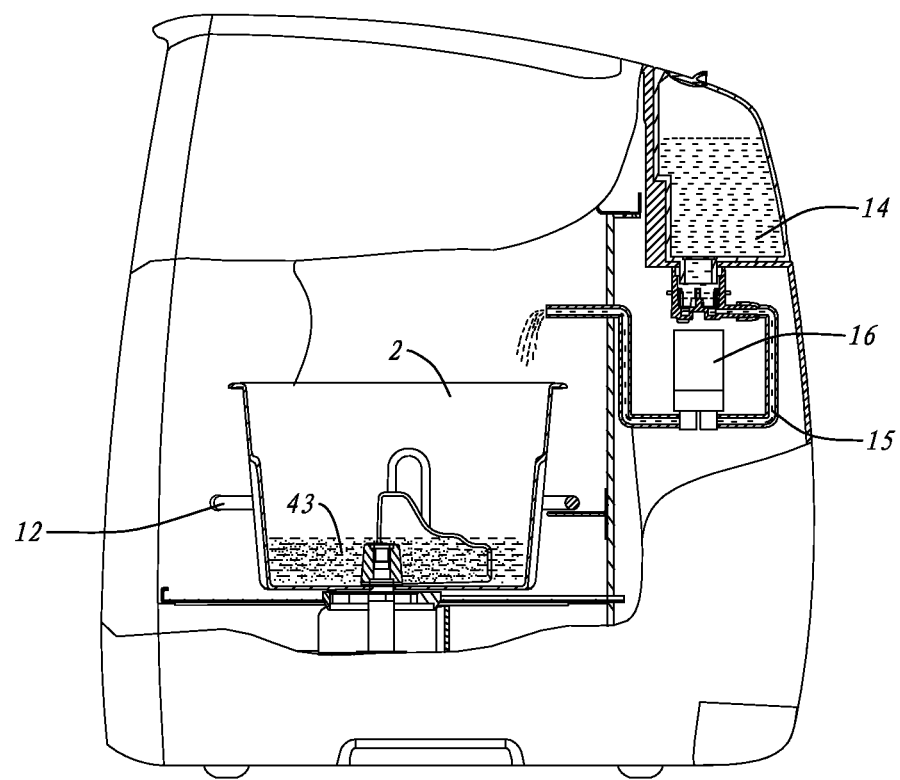
FIG. 13 illustrates the sectional view of the first embodiment, the second embodiment and the third embodiment of the present invention in same working state.

FIG. 13 illustrates another working state basic of this embodiment of watering the water tank 14, watering can be done in any time after FIG. 1. The water tank 14 has enough water and is controlled automatically or manually to supply water to the baking pan 2 through the water pipe 15 to water the bread ingredient 43. After that, start the electric heater 12. finally the bread baking is completed.

The full baking process in the first embodiment of the present invention is brief summarized as below:

Step 1. A ingredient box 4 with a weak outer wall is provided; the ingredient box 4 is applied with a film as the weak outer wall;

Step 2. The bread ingredient 43 with flour and baking powder according to proper formula is put into the ingredient box 4 and packaged; the step 1 and step 2 are pre-set by the manufacturer; put the ingredient into the first accommodating room and the second accommodating room of the ingredient box;

Step 3. make the opening 42 of the ingredient box 4 faced down in the hanging rack 3 above the baking pan 2 inside the automatic bread maker, operate the bread maker to make the sawtooth blade 32 of the hanging rack 3 pierced the film 45 of the ingredient box 4 and the bread ingredient 43 inside fell down to the baking pan 2, then water the baking pan 2;

Step 4. close the housing of the automatic bread maker and turn on the baking pan 2, the bread ingredient is processed with working dough of mixing, stifling and kneading, get the first dough in the baking pan;

Step 5. The dough in the baking pan 2 is on resting and fermentation; stir the dough and make the fermentation air leaked out of the dough to the baking pan 2; the bread accessory of the second accommodating room is dropped into the baking pan to be mixed and stirred with the first dough to get the second dough in the baking pan;

Step 6. the dough in the baking pan 2 is heated and baked until the bread is shaped well; get the baking pan out, and remove the shaped bread.

The step 3 to step 6 is self-processed by the user.

We can see that the home made bread method is supported with the automatic bread maker and the ingredient box, much saving the prepare time of the bread ingredient and making it a standardization module, that is the ingredient box; and the baking operation is simplified, the film 45 of the ingredient box 4 is pierced directly, the bread ingredient 43 is unloaded out to be baked after watered. This way prevents error of fermentation of the bread, and the method is simplified with low fault rate of the home made bread. Especially, the ingredient box 4 can be mass produced with maximally keeping the conformance of the taste. With the controlled water tank and the water pipe, the watering is automatic; there are several controlling methods for the water pipe 15 of the water tank 14 with water rationing.

The ingredient box 4 of this embodiment is disposed with formula mark 46 of computer readable. The housing 1 is disposed with corresponding recognition device, which reads the information on the formula mark 46 when the ingredient box 4 is positioned on the hanging rack 3. Then the recognition device gives command to the control block (not figured out) inside the automatic bread maker. With the formula mark 46 and the recognition device the automatic bread maker is intellective. Different bread formula with corresponding formula mark 46 to control the automatic bread maker to apply particular baking technique of stirring and baking. It does not need user to memory and consult, making the bread maker automatically choosing the proper proposal to work with humanization. There are many types of formula mark 46, such as stenciled geometrical pattern, contact recognition geometrical figure or radio frequency inductive module. This embodiment applies with the stenciled geometrical pattern and the recognition device applies with the array infrared ray TR-tube to read and recognize the different formula of pre-set geometrical pattern.

The Second Embodiment:

Refer to FIG. 6 to FIG. 11 of the second embodiment.

Figure 6:
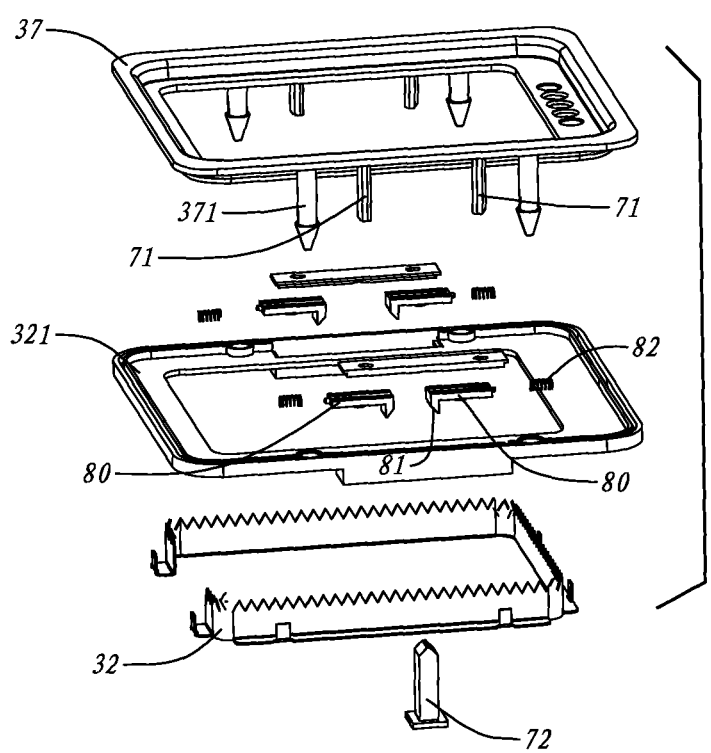
FIG. 6 illustrates the breakdown structure of the hanging rack of the second embodiment of the present invention.

The housing of this embodiment is similar to that of the first embodiment. The difference is in the hanging rack 3. FIG. 6 illustrates the breakdown structure of the hanging rack 3; in this embodiment, the hanging rack 3 is not fixed with respect to the housing, but movable up and down with respect to the housing; the sawtooth blade rack 321 can be movable up and down with respect to the housing; the sawtooth blade rack 321 is a fixation component for the sawtooth blade 32.

A self-locking device is disposed on the hanging rack 3, the self-locking device includes a pushing block 80, a limited post 71 and control block 72, there are four pushing blocks 80, which are laterally coupled to the sawtooth blade rack 321 of the hanging rack 3 in sliding way; the limited post 71 is fixed below the tray 37, the limited post 71 is extended down and vertical to the laterally moving path of the pushing block 80; the control block 72 is fixed to the housing; in the depress path of the hanging rack and the entirety of the sawtooth blade rack 321 and the tray 37, the pushing block 80 is laterally pushed.

Figure 7:
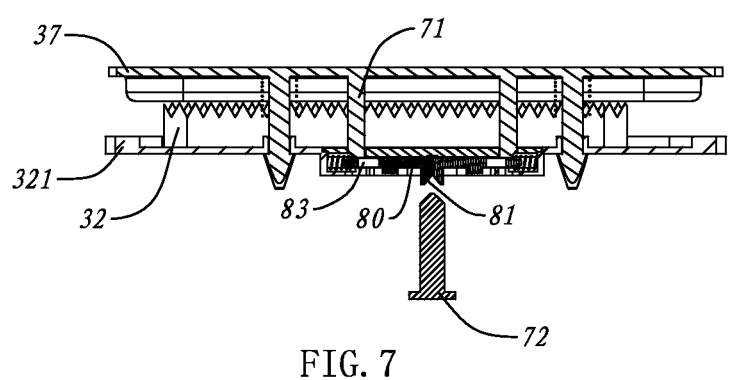
FIG. 7 illustrates the side view of the first state of hanging rack in FIG. 6.
Figure 8:
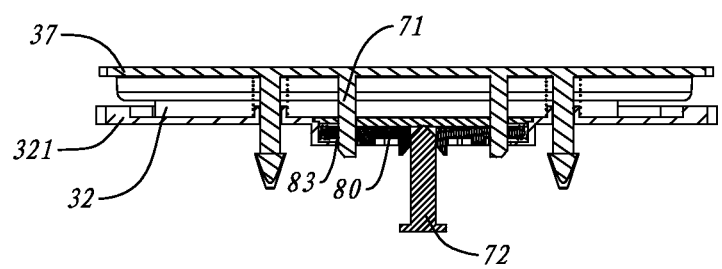
FIG. 8 illustrates the side view of the second state of the hanging rack in FIG. 6.

FIG. 7 is the side view of the first state of the hanging rack of the FIG. 6; FIG. 8 is the side view of the second state of the hanging rack of the FIG. 6. the two drawings illustrate the working state of the second embodiment.

FIG. 7 is the default state of the whole device, the tray 37 and the sawtooth blade rack 321 are not depressed, the control block 72 is not contacted with the pushing block 80 of the sawtooth blade rack 321, making the limiting hole 83 of the pushing block 80 and the limited post 71 of the tray 37 mismatched. As the limited post 71 moves downward, the tray 37 is stopped to be subsided. When the entirety of the tray 37 and the sawtooth blade rack 321 are not under the depress, that is to say when the ingredient box is not positioned right, the tray 37 can not move relative to the sawtooth blade rack 321, the sawteeth blade 32 will not be extended upward from the bottom of the tray 37, it prevents lying and ensur the safety of usage and the liable of the movable component of the device.

As figured in the FIG. 8, when the ingredient box is placed on the tray 37, the tray 37 and the sawtooth blade rack 321 are entirely subsided until the control block 72 contacts with the pushing block 80, making the pushing block 80 moving laterally. Then the limiting hole 83 of the pushing block 80 reaches to a certain position, and the limited post 71 of the tray 37 is freely passing through the limiting hole 83. FIG. 8 defines an unlock position that the tray 37 can move up and down freely relative to the sawtooth blade rack 321, so that the sawtooth blade 32 can be extended upward relative to the tray 37 to work out. Only if the whole device situated in the unlock position, the tray 37 can move up and down freely relative to the sawtooth blade rack 321 to work out. Otherwise, the tray 37 is fixed relative to the sawtooth blade rack 321 and the sawteeth blade 32 can not be extended out.

Figure 9:
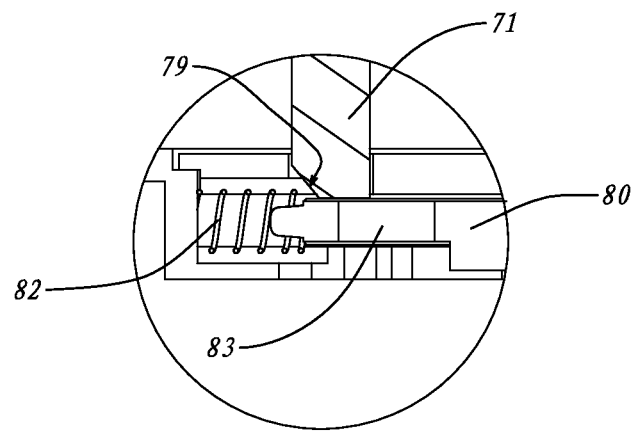
FIG. 9 illustrates the relative position of the pushing block 80 and the limited post 71 in FIG. 7.

FIG. 9 illustrates the detailed relative position of the pushing block 80 and the limited post 71 of the FIG. 7, showing the status that the limited post 71 is limited by the pushing block 80 downwards. The limiting hole 83 of the pushing block 80 is mismatched relative to the path of the limited post 71. At the bottom of the limited post 71, a limiting inclined surface 79 is disposed in the unlocking direction of the pushing block 80 to improve the unlock effect of the self-locking device, so that the pushing block 80 can slide left as figured in the drawing to unlock with the assistant of the limiting inclined surface 79 by the limited post 71. The unlocking is highly sensitive and in effect. With the restoring spring 82, the pushing block 80 is quickly self-restored after unlocked.

Figure 10:
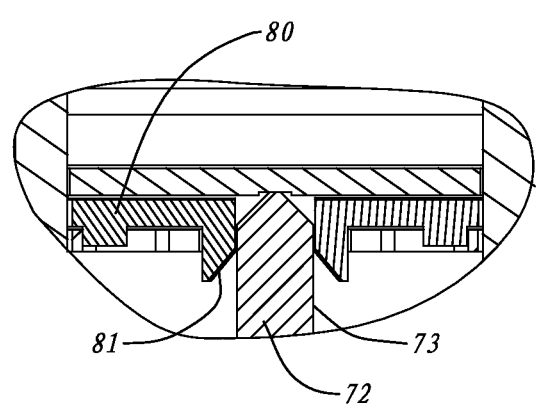
FIG. 10 illustrates the relative position of the control block 72 and the pushing block 80 in FIG. 8.

FIG. 10 illustrates the detailed relative position of the control block 72 and the pushing block 80 in FIG. 8, it's in the unlock position, after the top of the control block 72 is contacted with the inclined surface 81 of the pushing block 80, the unlock position is stable by the flatside 73 on the side surface of the control block 72, making the pushing block 80 situated in the unlock status. The structure makes the unlock position more stable with well fault tolerant rate. The hanging rack with the self-locking device has an advantage that when the hanging rack is taken out to clean, the tray 37, the sawteeth blade 32 and the sawtooth blade rack 321 are remaining stationary to protect the user and the device from being hurt by the sawteeth blade 32, it is provided with well safety.

Figure 11:
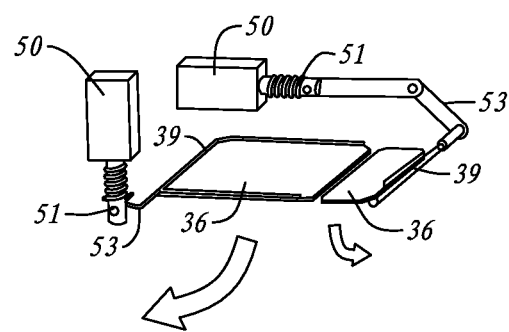
FIG. 11 illustrates the structure of the cover 36 and the supporting driving mechanism of the second embodiment of the present invention.

FIG. 11 illustrates the structure of the cover 36 and the supporting driving component of the embodiment; the bigger cover and smaller cover 36 are separately corresponding to the accommodating room of the ingredient box. The two covers have pivot shaft 39, the pivot shaft 39 is fixed with a pendulum arm 53. The pendulum arm 53 is controlled by the electromagnet 50 through the armature 51, making the cover 36 open downward following the arrow or closed upward in the reverse direction. It makes the opening time-saving and quick with smallest friction and resistance.

Figure 12:
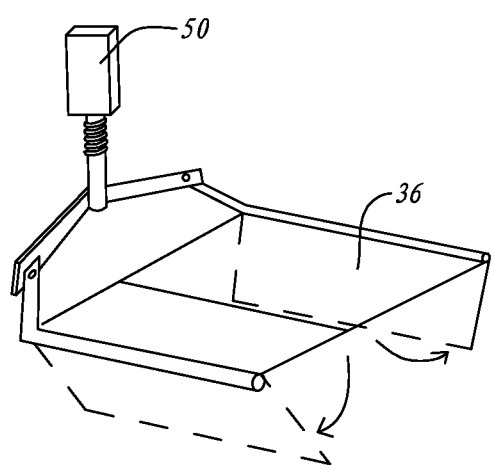
FIG. 12 illustrates the structure of the cover 36 and the supporting driving mechanism of the third embodiment of the present invention.

The Third Embodiment:

FIG. 12 illustrates the structure of the cover 36 and the supporting driving component of the third embodiment of the present invention. Most of it is similar to the second embodiment; the difference is that the bigger cover 36 is not single-gate faced downward, but double-gate of controlled by an electromagnet. It decreases the operation torque of the cover 36 and the open height, enhances the reliable of the opening mechanism and makes the space availability to realize automatic bread maker more compact.

Figure 14:
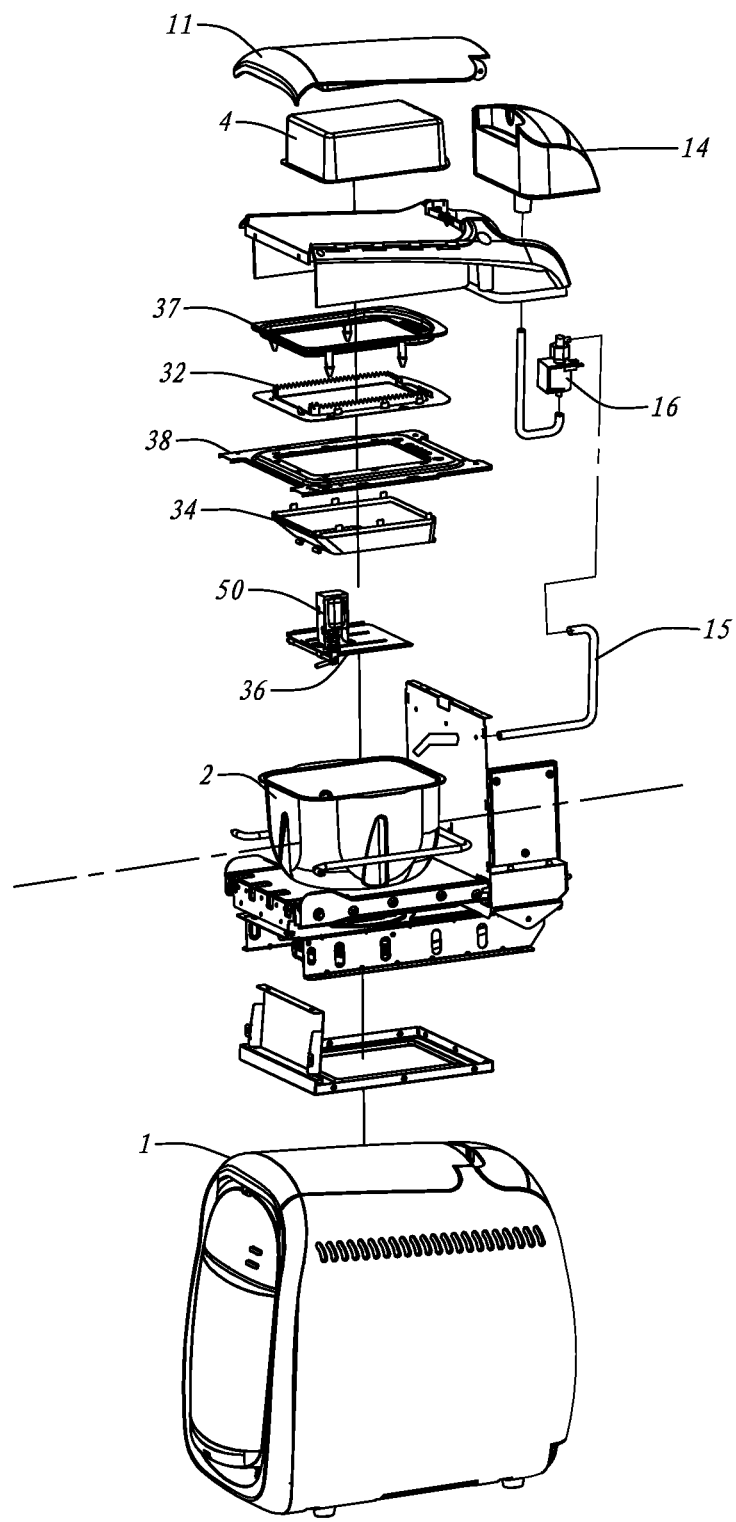
FIG. 14 illustrates the breakdown structure of the main components of the fourth embodiment of the present invention.
Figure 15:
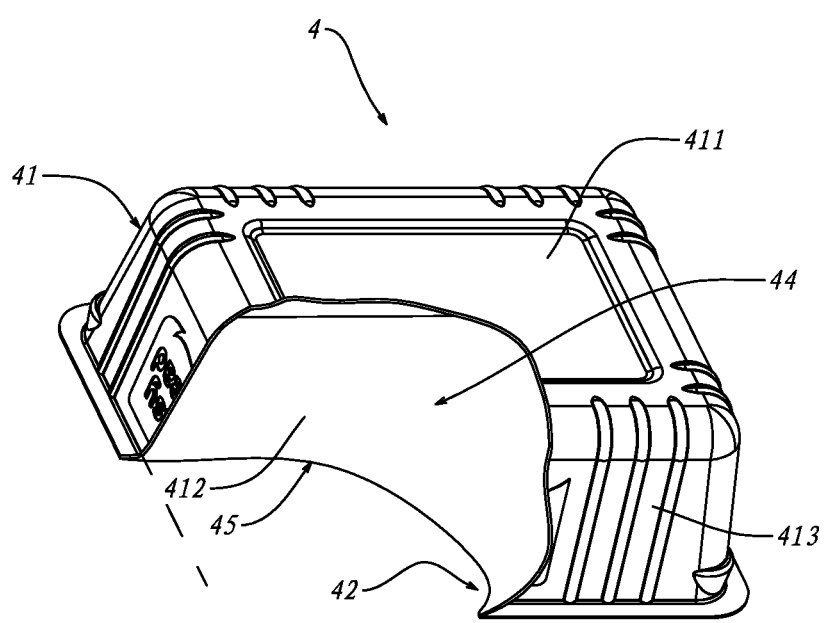
FIG. 15 illustrates the sectional view of the ingredient box of the forth embodiment of the present invention in FIG. 14.

The Fourth Embodiment:

As figured in FIG. 14 and FIG. 15 of the fourth embodiment of the present invention, the housing 1, the lid 11, the water tank 14, the water pipe 15, the pump 16, the baking pan 2 and other main components are similar to the previous embodiment, the hanging rack is similar to the second embodiment, it is detachable, the hanging rack includes the tray 37 and the sawtooth blade 32.

The difference is that, the ingredient box 4 has only one accommodating room 44, so that the sawtooth blade 32 is a single non-closed circular shape; there is only one stock bin 34 and one cover 34 below the stock bin.similarly, the cover 36 is controlled by an electromagnet 50, the cover 36 can open downwards, this embodiment can be seen as the essential edition of the second embodiment, it can be used to make bread with bread main ingredient, it operates smoothly and fast. With the stock bin 34, the timing of the unloading of the bread ingredient is controllable, so that it can make varies of bread. So the making step of this embodiment is similar to the first embodiment without the other stock bin and the second dough.

Please refer to the FIG. 15, which show the details of the ingredient box 4. The ingredient box 4 has a hard body 41, which is disposed with a hard side wall 413, two ends of the side wall are respectively disposed with a first wall 412 and a second wall 411, they form the accommodating room 44 and the opening 42 below; the first wall 412 is a film 45 easy to be pierced, the film 45 is coupled to and fixed to the opening 42, the film 45 is coupled to the sawtooth blade 32 of the hanging rack 3, the second wall 411 is depressed by the lid 11 to drive the sawtooth blade 32 to pierce the first wall 412.

The accommodating room 44 is closed by the film 45. The accommodating room 44 is contained with the bread ingredient including flour, fermentation powder, sources and so on. The bread ingredient is pre-set, so it can be watered to stir and bake, bread main formula, then these compositions of bread ingredient are mixed according to a certain ratio and then packaged. The opening 42 is disposed on a flat plane, the film 45 is coupled to the periphery of the top surface of the bottom of the opening 42. With this kind of the body 41, the attachment of the film 45 is simple and the package is well. The accommodating room 44 is flat box shaped; the opening 42 is situated in a bottom surface of the flat box shaped accommodating room. The coverage area of the opening 42 is not smaller than the cross section area of the accommodating room 44, ensuring that the bread ingredient 43 (as figured in FIG. 13) inside can be fully unloaded; especially, the hard body 41 is disposed with a flatside in the portion coupled to the film 45, as figured in the dot line in the left edge of the ingredient box 4 in FIG. 3. the flatside has an advantages that it is severed as a connection part between the film 45 and the body 41, when the other part of the film 45 is separated from the body 41, the flatside is retained, making the opening 42 exposed out most, no flour or other materials stays on the film. Considering the balance of the piecing effect and the strength of the film 45, the thickness of the film 45 is designed to range from 0.01 to 0.05 mm, it is material-saving, well piecing effect with enough strength. The shape of the hard body 41 and the film 45 is coupled to the shape of the sawtooth blade 32, ensuring that the cut of the film is large enough to expose the opening 42. the sawtooth of the sawtooth blade 32 is triangle shaped, the width is about 4 mm and the height is about 3.5 mm the height and the width of the sawtooth blade 32 can be changed according to the thickness of the film. The sawtooth blade has better cut effect working on the film 45.

The sawtooth blade 32 of the hanging rack is a non-closed annular shape in the horizontal plane, so when the film 45 of the ingredient box is pierced by the sawtooth blade 32, the part the film pierced by the sawtooth blade is liguliform, that is to say, most of the film is pierced, only an edge is still connected to the opening 42; the shape of the sawtooth blade 32 can be other shape like I shape, the film 45 pierced by the I shaped sawtooth blade 32 has several liguliform parts.

Figure 16:
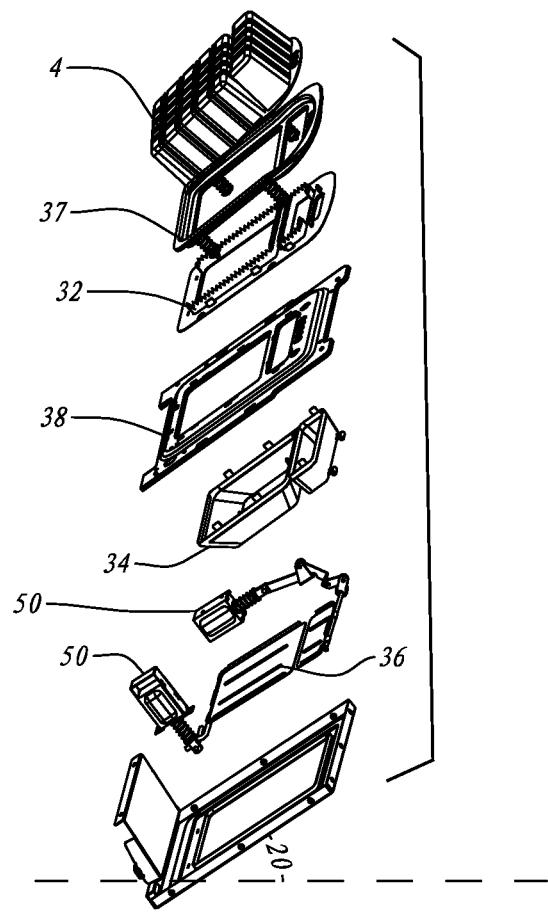
FIG. 16 illustrates the breakdown structure of the hanging rack and the ingredient box 4 of the fifth embodiment of the present invention.

The Fifth Embodiment:

Refer to FIG. 16. the housing and other main part of the fifth embodiment is similar to the previous embodiments; the hanging rack is similar to the fourth embodiment, the tray 37 and the sawtooth blade 32 to couple to the ingredient box 4 with two individual accommodating rooms, the separator 38, the stock bin 34 below the separator 38 and the cover 36 controlled by the electromagnet 50 are similar to the first embodiment, thereinto two covers are opened downwards in the opposite directions. In this embodiment, the hanging rack 3 has an angle of 20° to the horizontal plane, so that the ingredient box 4 has an angle of 20° to the horizontal plane as well, it is inclined assembled, it can dispose more components in the horizontal direction of the hanging rack 3 in the height limited bread maker, so that the structure can be more compact and smaller.

Figure 17:
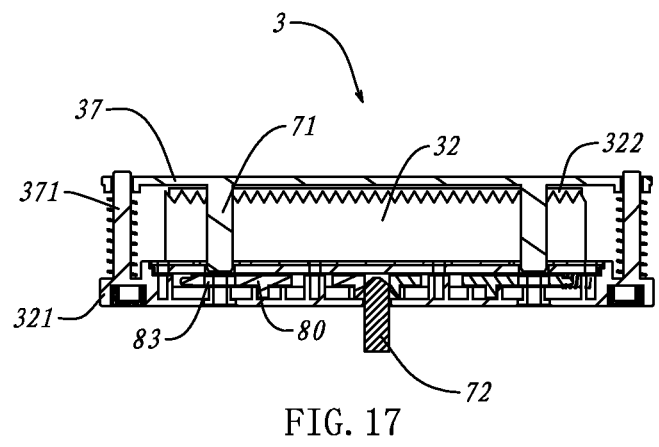
FIG. 17 illustrates the structure of the hanging rack of the sixth embodiment of the present invention in working state.
Figure 18:
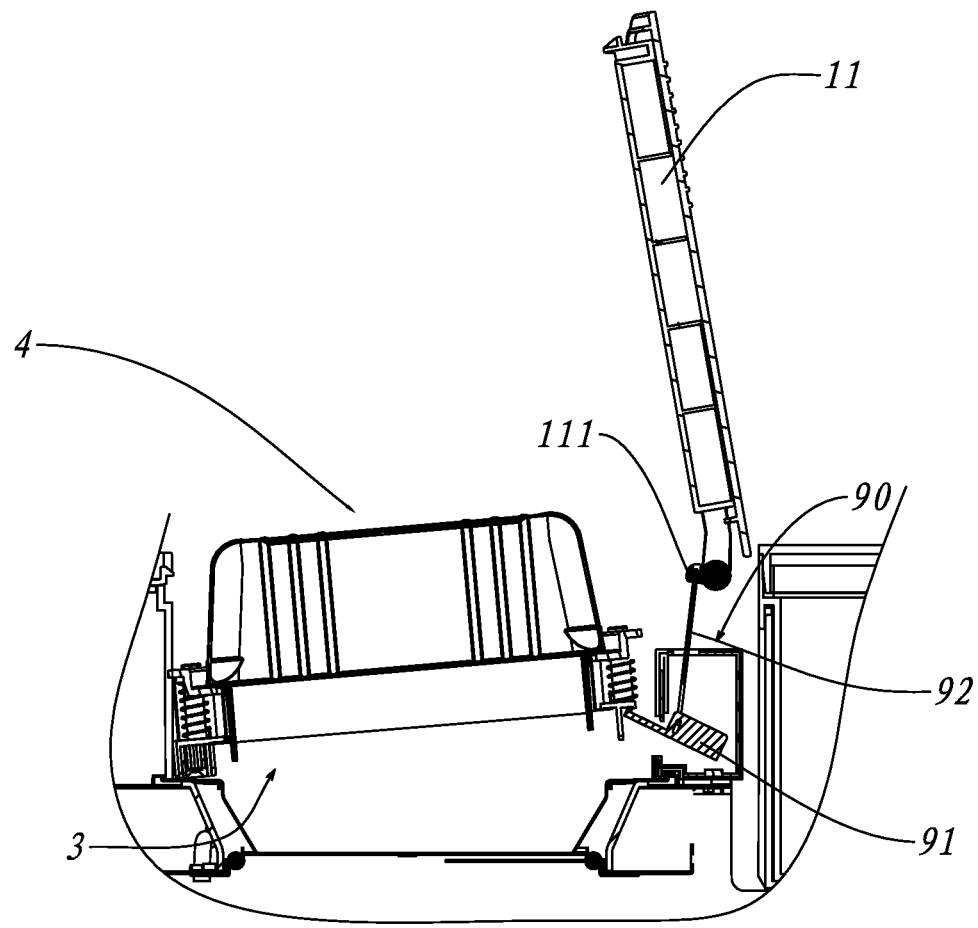
FIG. 18 illustrates the buffer mechanism 90 between the hanging rack 3 and the housing 1 of the sixth embodiment of the present invention in a working state.
Figure 19:
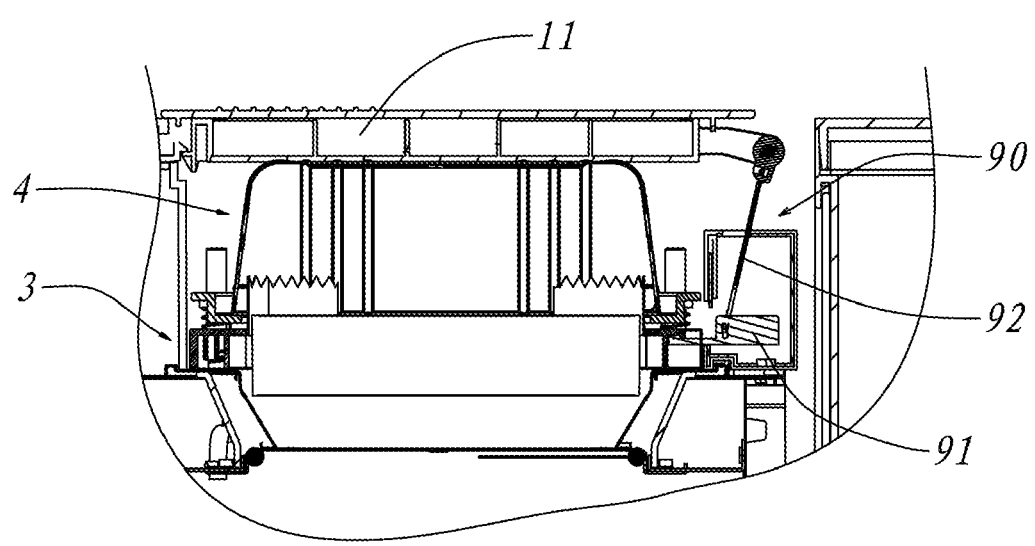
FIG. 19 illustrates the buffer mechanism 90 of the sixth embodiment in FIG. 18 in another working state.

The Sixth Embodiment:

FIG. 17 to FIG. 19 illustrates the partial structure of the sixth embodiment. The hanging rack 3 of this embodiment is figured in FIG. 17, FIG. 17 also shows that the hanging rack 3 is situated in the unlocking position. The control block 72 is contacted with the pushing block 80 and drives the pushing block 80 to move, so that the limited post 71 can pass through the limiting hole 83 of the pushing block 80 out, so that the tray 37 moves downwards, and the sawtooth blade 32 is extended upwards out of the tray 37 from the bottom to pierce the ingredient box on the tray 37.

The guide posts 371 of this embodiment are disposed upwards in the hanging rack 3, they passes through the tray 37, they are placed in the periphery of the sawtooth blade 321 of the hanging rack 3, the guide posts 371 stands still with respect to the housing 1, so that the movement of the tray 37 doesn't change the guide posts 371, so that the space below the hanging rack 3 is not influenced by the guide posts 371. when the tray 37 is depressed, the torsion due to inclination is small, the strength is well.

The sawtooth blade 32 of this embodiment is disposed with a protective board 322, which is higher than the sawteeth of the sawtooth blade 32 when the tray 37 is not depressed yet, so that the hanging rack 3 is very safe when it is held, clean or disassembled. when the hanging rack 3 is placed to the housing and the tray 37 is depressed with respect to the sawtooth blade rack 321, the sawtooth blade 32 is exposed out of the protective board 322.

As figured in FIG. 18 and FIG. 19, a buffer mechanism 90 is disposed in this embodiment. The buffer mechanism 90 includes a lifting lever 91 and a connecting rod 92, the lifting lever 91 is pivot joint to the housing, the left end of the lifting lever 91 is supported the hanging rack 3; two ends of the connecting rod 92 are respectively movably coupled to the lifting lever 91 and a cam 111, the cam 111 is disposed near the shaft of the lid 11;

As figured in FIG. 18, when the lid 11 is situated in open position, the lid 11 draws the lifting lever 91 to hold up through the connecting rod 92, making the lifting lever 91 held one side of the hanging rack 3, so that the hanging rack can not be fell down to the unlock position; meanwhile the ingredient box 4 is not pierced yet.

As figured in FIG. 19, when the lid 11 is situated in the close position, the lid 11 releases to draw the connecting rod 92, making the lifting lever 91 fell down, so that the hanging rack 3 is released and fell down to the unlock position, the ingredient box 4 is pierced.

The buffer mechanism 90 provides a safety to this embodiment, when the lid 11 is lifted, the piecing can not work until the lid 11 is covered down. The operation is smooth, it does not need other control mechanism, that is to say, it is applied with the lid 11 to be a control component, it accord with the operation and the usage habit, this embodiment has advantages of simple, safe and fast.

Although the present invention has been described with reference to the preferred embodiments thereof for carrying out the patent for invention, it is apparent to those skilled in the art that a variety of modifications and changes may be made without departing from the scope of the patent for invention which is intended to be defined by the appended claims.

What is claimed is:

1. An automatic bread maker, comprising a housing, a baking pan is disposed inside the housing to mix or heat the bread ingredient, the baking pan is disposed with an entrance of faced up; wherein inside the housing, a hanging rack to place a ingredient box and a stock bin below the hanging rack are disposed above the entrance of the baking pan; the hanging rack is disposed with a sawtooth blade to pierce the ingredient box, the stock bin is disposed with a drop opening; the sawtooth blade is faced up; the drop opening is faced to the entrance, the size of the drop opening is smaller than that of the entrance; when the ingredient box is pierced, the bread ingredient of the ingredient box is dropped down to the stock bin; the stock bin includes a tubular wall and a cover coupled to the drop opening at the bottom of the wall; a driving mechanism is further disposed to control the cover to be open or to be closed relative to the wall to make the bread ingredient inside the stock bin fell down from the drop opening or kept inside the stock bin.

2. An automatic bread maker according to claim 1, wherein the shape of the sawtooth blade rounded in the horizontal plane is I shaped or non-closed circularity shaped.

3. An automatic bread maker according to claim 1, wherein a lid is further disposed above the hanging rack to flexible connected to the housing; when the lid is pressed down to couple to the position of the housing, the ingredient box is driven to be positioned to be pierced by the sawtooth blade.

4. An automatic bread maker according to claim 3, wherein the hanging rack is disposed with a tray, the tray is coupled to the external periphery of the lower of the ingredient box to limit the ingredient box in the horizontal plane; the tray is movable to couple to the hanging rack in the vertical direction, the tray is disposed with a tray hole, the sawtooth blade can be passing through the tray hole.

5. An automatic bread maker according to claim 4, wherein the hanging rack is movably coupled to the housing up and down; the hanging rack is disposed with a self-locking device, when the hanging rack is falling to an unlock position relative to the housing, the self-locking device unlocks, so that the tray falls down inside the hanging rack, then the sawtooth blade gets up and passes through the tray; when the hanging rack is situated at the outside of the unlock position relative to the housing, the self-locking device prevents the tray falling down inside the hanging rack, making the sawtooth blade unable to get up to pass through the tray.

6. An automatic bread maker according to claim 5, wherein the self-locking device comprising:
    a pushing block, which is coupled to the hanging rack in laterally sliding way, the pushing block is disposed with a limiting hole and an inclined guiding surface;
    a limited post, which is fixed to the tray and extended downwards, the limited post is vertical to the laterally moving path of the pushing block;

a control block, which is fixed to the housing; the control block is contacted with the inclined surface to push the pushing block at the pressing path of the hanging rack;

the unlocking position is as below: when the hanging rack is falling down to a certain height, the control block is withstood the inclined surface of the pushing block, making the pushing block moving laterally to a certain position, and finally the limited post of the tray moves downward and just passes through the limiting hole;

a restoring spring is disposed between the pushing block and the hanging rack.

7. An automatic bread maker according to claim 5, wherein a buffer mechanism is further disposed at the housing in the position holding the hanging rack, the buffer mechanism is disposed with a lifting lever, which is pivot joint to the housing, one end of the lifting lever is supported the hanging rack; a connecting rod is further disposed, two ends of the connecting rod are respectively movably coupled to the lifting lever and the lid of the housing;

when the lid is situated in open position, the lid draws the lifting lever to hold up through the connecting rod, making the lifting lever held one side of the hanging rack, so that the hanging rack can not be fell down to the unlock position;

when the lid is situated in the close position, the lid releases to draw the connecting rod, making the lifting lever fell down, so that the hanging rack is released and fell down to the unlock position.

8. An automatic bread maker according to claim 1, wherein a shockproof mechanism is further disposed inside the housing near the hanging rack, the shockproof mechanism is controlled to make the ingredient box placed in the hanging rack shaking, making the bread ingredient inside the ingredient box totally fell down.

9. An automatic bread maker according to claim 1, wherein the cover is pivot joint to the stock bin in single gate opened downwards way.

10. An automatic bread maker according to claim 1, wherein the cover is pivot jointed to the stock bin in double-gate opened downwards way.

11. An automatic bread maker according to claim 9, wherein the shaft of the cover is fixed with a pendulum arm; the driving mechanism is disposed with an electromagnet, the pendulum arm is pulled by an armature of the electromagnet through a rod to control the cover.

12. An automatic bread maker according to claim 1, wherein the wall of the stock bin is gradually narrowed from up to down, the cover is coupled to the end surface in the bottom of the wall.

13. An automatic bread maker according to claim 1, wherein the sawtooth blade is movably coupled to the hanging rack in the vertical direction, the sawtooth blade is controlled by an unloading electromagnet, the unloading electromagnet is controlled to drive the sawtooth blade to move up and down to pierce the film of the ingredient box.

14. An automatic bread maker according to claim 1, wherein the housing is disposed with a water tank and a water pipe below the water tank, the water pipe is controlled to transfer the water in the water tank to the baking pan.

15. An automatic bread maker according to claim 1, wherein the housing is disposed with a control block and a recognition device, the formula information on the ingredient box is detected and read by the recognition device and then transmitted to the control block, the control block sets different cooking programs according to the formula information.

16. An automatic bread maker according to claim 1, wherein the baking pan is in and out of the housing from the side of the housing.

17. An automatic bread maker according to claim 1, wherein the hanging rack is inclined relatively to the horizontal plane; the ingredient box placed on the hanging rack is inclined relatively to the horizontal plane as well.

18. A bread ingredient box applied in the automatic bread maker according to claim 1, wherein the ingredient box with bread ingredient inside is disposed with a hard side wall, two ends of the side wall are respectively disposed with a first wall and a second wall, the first wall is a film easy to be pierced, and the film is applied together with the sawtooth blade of the hanging rack, when the second wall is pressed down, the sawtooth blade pierces the first wall.

19. A bread ingredient box according to claim 18, wherein the thickness of the film is ranged from 0.01 to 0.05 mm.

20. A bread ingredient box according to claim 18, wherein the shape of the film is coupled to that of the sawtooth blade.

21. A bread ingredient box according to claim 18, wherein the ingredient box has two accommodating rooms, the number of the first wall is two, two first walls are respectively corresponding to the accommodating rooms; one of the accommodating rooms is loaded with the bread ingredient, the other one is loaded with bread accessory with fruit.

22. A bread ingredient box according to claim 18, wherein the exterior is disposed with formula mark of machine readable.

23. A bread ingredient box according to claim 18, wherein the first wall is disposed in a plane, the film is coupled to the periphery of the top surface of the mouth of the ingredient box.

24. A bread ingredient box according to claim 18, wherein the side wall of the accommodating room is an inclined surface of gradually widened from the top surface to the bottom surface or an inclined surface of widened in sections.

25. A bread ingredient box according to claim 24, wherein the inclined surface is gradually widened, the inclined angle is ranged from 3° to 20°.

26. A bread ingredient box according to claim 24, wherein the inclined surface is gradually widened, the inclined angle is 7°.

27. A bread ingredient box according to claim 18, wherein the side wall is rectangle shaped.

28. A bread ingredient box according to claim 18, wherein the second wall and the side wall are applied with different hard material.

29. A bread ingredient box according to claim 18, wherein the second wall and the side wall are applied with same hard material.

30. A bread ingredient box according to claim 29, wherein the hard material is used with PP.

* * * * *